(12) United States Patent
Meier et al.

(10) Patent No.: US 8,447,466 B2
(45) Date of Patent: May 21, 2013

(54) METHOD FOR CONTROLLING PRESSURE IN A COMPRESSED-AIR ACCUMULATOR OF A VEHICLE LEVEL-CONTROL SYSTEM

(75) Inventors: Jörg Meier, Oldendorf (DE); Olaf Thielking, Hannover (DE)

(73) Assignee: WABCO GmbH, Hannover (DE)

( * ) Notice: Subject to any disclaimer, the term of this patent is extended or adjusted under 35 U.S.C. 154(b) by 1774 days.

(21) Appl. No.: 10/912,593

(22) Filed: Aug. 5, 2004

(65) Prior Publication Data

US 2005/0035562 A1   Feb. 17, 2005

(30) Foreign Application Priority Data

Aug. 8, 2003  (DE) ................... 103 36 441

(51) Int. Cl.
*B60G 11/026* (2006.01)
*G06F 19/00* (2006.01)

(52) U.S. Cl.
USPC ............. 701/36; 701/37; 701/38; 280/5.514; 280/5.515; 280/6.159; 280/124.16; 188/313; 188/282.1; 188/322.15; 267/64.28

(58) Field of Classification Search
USPC .................. 280/5.514, 124.16, 840, 124.157, 280/707; 701/37, 36, 38; 188/313, 282.1, 188/322.15; 267/64.28, 64.25, 64.11
See application file for complete search history.

(56) References Cited

U.S. PATENT DOCUMENTS

| | | | |
|---|---|---|---|
| 4,647,069 A * | 3/1987 | Iijima | 280/5.514 |
| 4,821,191 A * | 4/1989 | Ikemoto et al. | 701/38 |
| 5,083,275 A * | 1/1992 | Kawagoe et al. | 701/37 |
| 6,266,590 B1 * | 7/2001 | Kutscher et al. | 701/37 |
| 2002/0070523 A1 * | 6/2002 | Roemer et al. | 280/124.157 |
| 2002/0188321 A1 | 12/2002 | Levinson | |
| 2003/0107191 A1 | 6/2003 | Romer et al. | |

FOREIGN PATENT DOCUMENTS

| | | | |
|---|---|---|---|
| DE | 198 13 672 C1 | 5/1999 |
| DE | 101 22 567 C1 | 11/2002 |
| DE | 101 60 972 C1 | 1/2003 |

* cited by examiner

*Primary Examiner* — Ronnie Mancho
(74) *Attorney, Agent, or Firm* — Kramer Levin Naftalis & Frankel LLP

(57) ABSTRACT

A method for controlling the pressure in a compressed-air accumulator of a level-control system of a motor vehicle utilizing a pressure-control apparatus constructed and arranged to adjust the accumulator pressure according to a predetermined index pressure value. The index pressure value is automatically determined by a computing device based on the relative level and/or the load of the vehicle.

14 Claims, 3 Drawing Sheets

METHOD FOR CONTROLLING PRESSURE IN A COMPRESSED-AIR ACCUMULATOR OF A VEHICLE LEVEL-CONTROL SYSTEM

BACKGROUND OF THE INVENTION

The present invention relates to a method for controlling pressure in a compressed-air accumulator of a level-control system of a motor vehicle.

Methods of the general type under consideration are known, for example, from DE 101 22 567 C1 and DE 101 60 972 C1.

A level-control system for a vehicle is typically provided at each wheel suspension of the vehicle with an air spring bellows to which compressed air can be supplied or from which compressed air can be removed via a valve device. Usually, a compressor is provided to generate the compressed air. To achieve short times for filling and venting the air spring bellows and thus short times for raising and lowering the vehicle body, and to save on the energy required for this purpose, it is advantageous to design such a level-control system as a closed or partly closed system containing a compressed-air accumulator. The compressor is then used primarily to transport compressed air back and forth between the compressed-air accumulator and the air spring bellows. Depending on the operating condition of the vehicle and on external ambient conditions, a variable pressure level in the compressed-air accumulator may be advantageous for achieving short times for filling and venting the air spring bellows and for achieving low energy consumption.

DE 101 60 972 C1 describes how to control the air quantity in a level-control system, while also taking the ambient temperature of the vehicle into consideration via a temperature sensor. For this purpose, a separate temperature sensor for measuring the ambient temperature is necessary.

DE 101 22 567 C1 describes controlling the pressure in the compressed-air accumulator indirectly by determining the air quantity in the level-control system. For simplicity, in determining the air quantity in the level-control system, it is assumed that this quantity is composed of individual air quantities in the air spring bellows and in the compressed-air accumulator and that the individual air quantities in the air spring bellows can be calculated from measured values of pressure and height sensors.

Conventionally, the physical variables relevant for control of the accumulator pressure are taken into consideration not at all or only inadequately. For example, the ambient temperature is not an essential physical variable that determines the efficiency of operation of the level-control system. Even determination of the air quantity does not lead to a physical variable by means of which satisfactory efficiency can be achieved during operation of the level-control system.

Accordingly, the object of the invention is to provide, for control of the pressure in a compressed-air accumulator of a level-control system for a motor vehicle, a method that permits efficient operation of the level-control system. It should be understood that efficient operation of the level-control system is characterized by, for example, low energy consumption, short times for raising and lowering the vehicle body, and the capability of using a compressor designed for the smallest possible delivery capacity.

SUMMARY OF THE INVENTION

Generally speaking, in accordance with the present invention, a new method for controlling the pressure in a compressed-air accumulator of a level-control system of a motor vehicle is provided which improves over prior art methods.

According to a preferred embodiment of the present invention, the relative level and/or load of the vehicle are used as physical variables for control of the accumulator pressure. In the context of level-control systems for motor vehicles, "relative level" refers to the height of the vehicle body relative to the chassis. This variable is therefore a vertical length measure. The term "load" refers to the laden mass in kilograms compared with the mass of the unladen vehicle. Each of these variables independently has a decisive influence on the potential energy stored in the vehicle body ($W_{pot}=m*g*h$; where m=mass, g=gravitational acceleration, h=height). The relative level is correlated directly with the height h and the load directly with the mass m. If, for example, a change of relative level of the vehicle is demanded by the vehicle user, for example from a low level to a high level, a change of the potential energy stored in the vehicle body is necessary by virtue of the change in height of the vehicle body. This energy change is brought about by the level-control system, which supports the vehicle body via the air spring bellows. During raising or lowering of the vehicle body, not only the compressor but also the potential energy present in the form of stored compressed air in the compressed-air accumulator can provide a contribution to changing the potential energy of the vehicle body, in this case by increasing the potential energy, provided the accumulator pressure has an appropriate value.

Analogously, if the load of the vehicle is increased, as occurs, for example, when further passengers get on board, an increase of the potential energy of the vehicle body takes place and is compensated for by the level-control system in order to keep the relative level constant. In this case, the needed potential energy is again supplied by the compressor as well as by the potential energy stored in the compressed-air accumulator.

According to an advantageous embodiment of the present invention, the level-control system is provided with at least one air spring bellows having variable bellows pressure, and a computing device for automatic determination of the index pressure value which uses at least one parameter map specifying the dependence of bellows pressure on relative level and/or on the load condition for discrete relative levels and/or load conditions. "Bellows pressure" refers to the air pressure in an air spring bellows. Thus, it is possible in simple manner to represent and take into consideration the nonlinear relationships—inherent to the manufacturing process—encountered between bellows pressure and relative level and/or load condition during use of commercial air spring bellows made of rubber. In the normal working range of an air spring bellows, the volume thereof usually increases monotonically both with increasing deflection, or in other words with increasing relative level of the vehicle body, and with increasing pressure. This deflection-dependent volume change depends on the extension of the wall of the air spring bellows, while the pressure-dependent volume change depends on expansion of the lateral wall of the air spring bellows. Typically, the pressure-dependent volume increase becomes greater at larger deflection, since a further extended bellows permits larger cross-sectional expansions. The exact extent of this pressure-dependent and deflection-dependent volume change is specific to each respective bellows and is determined individually, for example by measurement.

According to another advantageous embodiment of the present invention, the computing device determines the load of the vehicle by means of the parameter map. This permits the load to be determined quickly, with high accuracy and with little computational complexity.

According to a further advantageous embodiment of the present invention, a measured value of the relative level of the vehicle is used for automatic determination of the index pressure value. This has the advantage of making it possible to use the signals of existing sensors, such as the relative-level sensors, thus obviating the need for additional sensors.

According to yet another advantageous embodiment of the present invention, a predetermined index value of the relative level is used in addition to or as an alternative to the automatic determination of the index pressure value. As an example, the relative level predetermined by the vehicle user can be used for this purpose. It can be adjusted via a control element in the vehicle. In a level-control system, the actual value of the relative level is usually adapted automatically to the predetermined index value of relative level. Such adaptation of the actual value to the index value is an operation that requires a finite amount of time, during which the actual value gradually changes. Such use of the index value for automatic determination of the index pressure value has the advantage that it is based on the index value, which remains constant after being changed by the vehicle user, and not on the gradually changing actual value, which, under certain circumstances, might lead to unsatisfactory control response during control of the accumulator pressure.

Still other objects and advantages of the invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
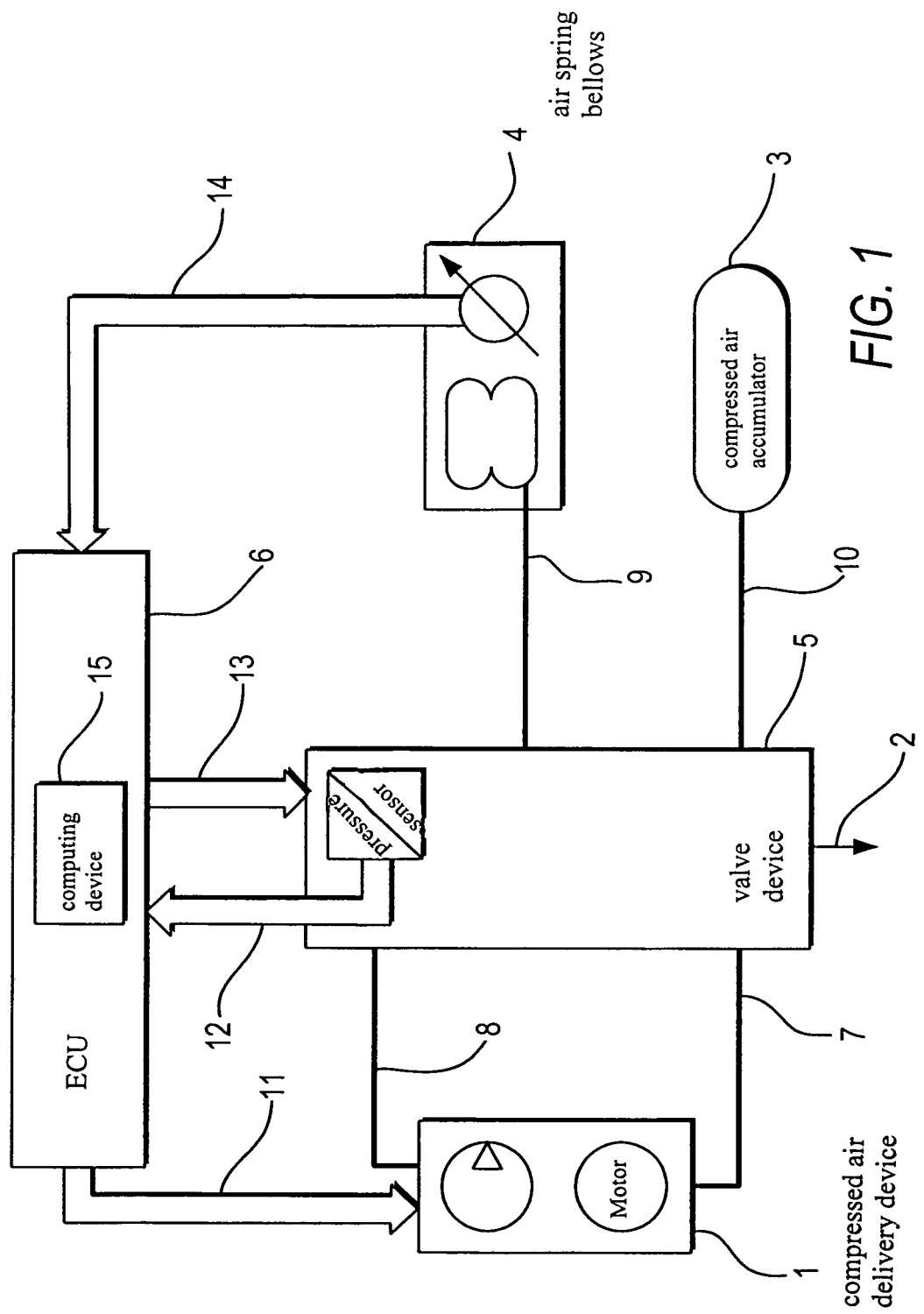
FIG. 1 is a schematic diagram of a level-control system for a vehicle in accordance with the present invention.

Referring now to the drawing figures, where like reference numerals are used for corresponding elements, FIG. 1 depicts elements of a vehicle level-control system pertinent to the present invention. The level-control system shown in FIG. 1 is provided with a compressed-air delivery device 1, a valve device 5, pneumatic lines 7, 8 for placing compressed-air delivery device 1 in communication with valve device 5, an atmospheric port 2 in communication with valve device 5, a compressed-air accumulator 3, a pneumatic line 10 for placing compressed-air accumulator 3 in communication with valve device 5 and an air spring bellows 4 representative of a plurality of air spring bellows together with associated relative-level sensor, as well as a pneumatic line 9 for placing air spring bellows 4 in communication with valve device 5. An electronic control unit 6 is also provided which contains a computing device 15 for effecting the method according to the present invention. Electronic control unit 6 is connected via signal lines 11, 12, 13, 14 to compressed-air delivery device 1, to valve device 5 and to the relative-level sensor of air spring bellows 4.

Compressed-air delivery device 1 can include, for example, a compressor, which can be driven by an electric motor. The compressor takes in air from pneumatic line 7 and discharges it in the form of compressed air via pneumatic line 8. Via signal line 11, the compressor can be turned on and off as appropriate by electronic control unit 6.

Valve device 5 is used for control of the compressed-air streams between the pneumatic lines 7, 8, 9, 10 and atmospheric port 2. For this purpose, valve device 5 can be controlled by electronic control unit 6 via a signal line 13, or, if necessary, via a plurality of signal lines.

Depending on mode of operation of the level-control system, electronic control unit 6, by transmitting appropriate electrical signals via signal line 13, can activate valve device 5 such that air is sucked in via atmospheric port 2 by compressed-air delivery device 1 and delivered optionally into air spring bellows 4 or into compressed-air accumulator 3. In a further mode of operation, compressed air present in the level-control system can be vented via atmospheric port 2, from air spring bellows 4 or from compressed-air accumulator 3, for example, and optionally with or without support by compressed-air delivery device 1. In yet a further mode of operation, compressed air can be directed from air spring bellows 4 to compressed-air accumulator 3 or vice-versa by appropriate adjustment of valve device 5, optionally with or without support by compressed-air delivery device 1.

In addition, valve device 5 can include a pressure sensor, with which the prevailing pressure in air spring bellows 4 or the pressure in compressed-air accumulator 3 can be measured. The pressure sensor transmits an electrical signal via signal line 12 to electronic control unit 6, which processes this pressure signal.

In one embodiment of the present invention, a correlation table specifying a correlation between the index pressure value of the accumulator pressure and the relative level for particular discrete relative levels is stored in electronic control unit 6.

As an example, the correlation table can have the following structure:

| Relative level | Index pressure value |
|---|---|
| Low level | 11 bar |
| Driving level | 8 bar |
| High level | 2 bar |

From the relative-level signal transmitted by the relative-level sensor, computing device 15 determines the current relative level of the vehicle body. In practice, the relative-level sensor will transmit, to the electronic control unit, numerical values with which particular relative levels are then correlated in accordance with the foregoing correlation table. In such a case, it is advantageous to provide, in the correlation table, the corresponding numerical values for the respective relative levels.

Computing device 15 then determines the relative level in the correlation table which most closely approaches the transmitted relative level. Thereafter, computing device 15 extracts from the correlation table the index pressure value of accumulator pressure which correlates with this relative level, checks, on the basis of the actual value of accumulator pressure measured by means of the pressure sensor, whether this value deviates from the index pressure value, and raises or lowers the accumulator pressure as needed by outputting activation signals to valve device 5 and compressed-air delivery device 1.

In another embodiment of the present invention, an expanded correlation table is stored in electronic control unit 6. This table permits an index pressure value of accumulator pressure to be determined on the basis of the relative level and additionally on the basis of the load. For this purpose, computing device 15 measures not only the relative level as discussed above, but also the load of the vehicle. Measurement of the load can involve, for example, measuring the bellows pressure in air spring bellows 4, for example via the pressure sensor provided in valve device 5. In this way, it is possible to measure the load directly and with little complexity. By virtue of the characteristic properties of air spring bellows discussed above, it is advantageous, according to a further embodiment of the present invention, to take these characteristics into consideration in determination of the load.

Figure 2:
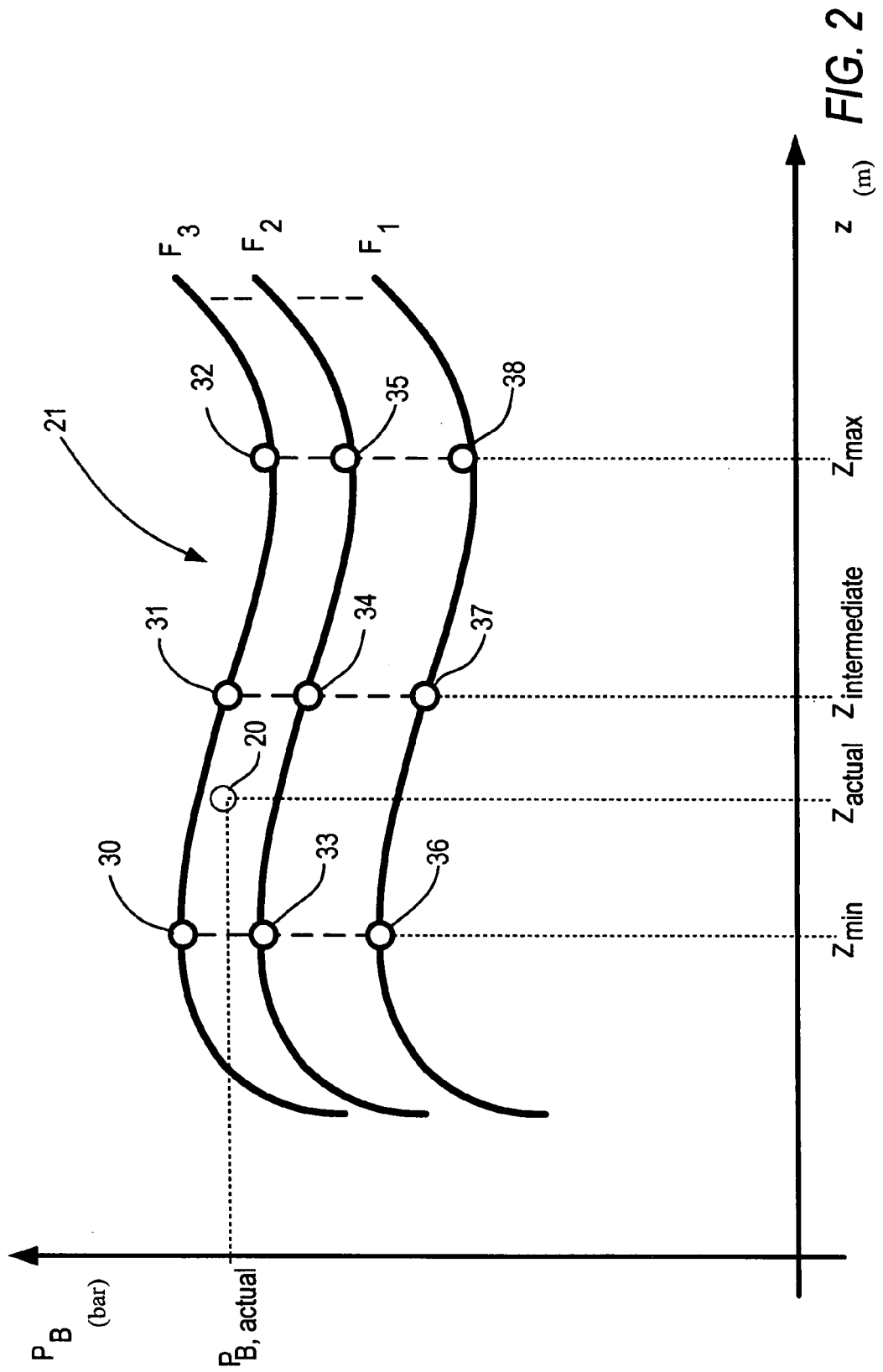
FIG. 2 is a characteristics map illustrating the dependence of bellows pressure on relative level and vehicle load according to one embodiment of the present invention.

Referring now to FIG. 2, the variation of bellows pressure $p_B$ typical of air spring bellows 4 is plotted against the deflection Z for various load conditions $F_1, F_2, F_3$ of the vehicle. The deflection Z of air spring bellows 4 takes place parallel to the relative level of that part of the vehicle body which is braced via air spring bellows 4 against the chassis. The deflection Z corresponds, for example, to the relative-level signal transmitted by the relative-level sensor to electronic control unit 6. The characteristics depicted in FIG. 2 can be determined experimentally. As can be seen from FIG. 2, the bellows pressure $p_B$ is a nonlinear function of the deflection Z. The relationship of the bellows pressure $p_B$ to the load F of the vehicle is also nonlinear.

According to another embodiment of the present invention, there is stored in electronic control unit 6 a parameter map that contains discrete values of the characteristics according to FIG. 2, such as the values 30, 31, 32, 33, 34, 35, 36, 37, 38.

According to a further embodiment of the present invention, the load of the vehicle is determined by computing device 15 through use of the stored parameter map. For this purpose, computing device 15 first determines the bellows pressure $p_B$ as well as the deflection Z on the basis of the signals of the relative-level sensor and pressure sensor. Computing device 15 then locates in the parameter map the characteristic most closely approaching these values. The vehicle load to be determined is equal to the load correlating with this characteristic. For the case where no exactly corresponding values are present in the parameter map for the respective bellows pressure $p_B$ or deflection Z, intermediate values are interpolated, for example, by linear interpolation of the closest adjacent values in the parameter map or by another suitable interpolation method, such as, for example, spline interpolation of all values of the parameter map belonging to a characteristic $F_1, F_2, F_3$.

According to embodiments of the present invention which utilize an expanded correlation table, computing device 15 uses the vehicle load determined in this way in combination with the relative level in order to determine the index pressure value of the accumulator pressure from the expanded, two-dimensional correlation table. As an example, the correlation table can have the following structure:

| Index level | Index pressure value at minimal load | Index pressure value at intermediate load | Index pressure value at maximal load |
|---|---|---|---|
| Low level | 10 bar | 11 bar | 12 bar |
| Driving level | 7 bar | 8 bar | 10 bar |
| High level | 1 bar | 2 bar | 3 bar |

Figure 3:
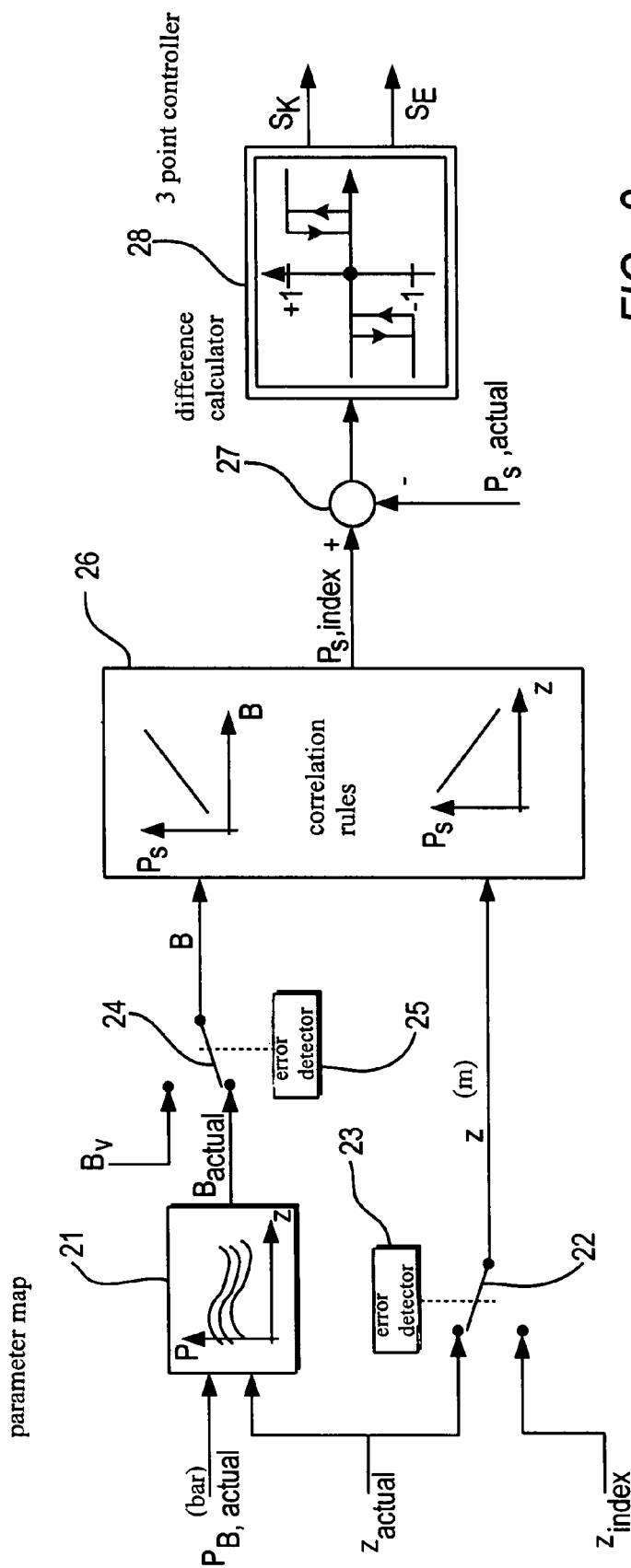
FIG. 3 is a block diagram depicting an embodiment of the present invention.

Referring now to FIG. 3, a control-engineering block diagram of an advantageous embodiment of the present invention for controlling the pressure in compressed-air accumulator 3 is depicted. A block 21 contains the parameter map according to the characteristics of FIG. 2. Also provided is a block 26 which contains correlation rules for correlation of the index pressure value $P_{S,index}$ with the load B and the deflection Z. The correlation rules can be resident in a form such as a table, a mathematical function or a further parameter map. The correlation rules are preferably stored in electronic control unit 6.

A further block 28 represents a three-point controller with hysteresis. Advantageously, the hysteresis values can be variably configured and varied as a function of the previously discussed variables or further variables. Three-point controller 28 transmits two switching signals $S_K, S_E$ which are used by electronic control unit 6 to generate control signals for valve device 5 and compressed-air delivery device 1 in order to raise or lower the accumulator pressure. The switching signals $S_K, S_E$ are on/off signals, and at any time only one of the signals can have the value "on."

Also depicted in FIG. 3 are error detectors 23, 25 which detect malfunctions in the level-control system and trigger appropriate reactions thereto. Examples of such malfunctions are defects in the sensors, such as the pressure sensor or the relative-level sensors. In the event of faulty sensor signals, it may no longer be possible to determine certain of the variables, such as the load B or the actual value $Z_{actual}$ of the relative level of the entire vehicle body, needed for the invention according to FIG. 3 to be fully functional. Upon recognition of such an error, error detectors 23, 25 therefore cooperate with changeover switches 22, 24 to change over the signals being used to alternative signals. Thus, in the event of a defect or malfunction of a relative-level sensor, error detector 23 acts via changeover switch 22 to trip changeover of the deflection signal Z from the actual value $Z_{actual}$ of the relative level to the index value $Z_{index}$ of the relative level. In the event of a defect or malfunction of one of the relative-level sensors or of the pressure sensor, the load B of the vehicle can no longer be determined via parameter map 21. In such a case, error detector 25 acts via changeover switch 24 to trip changeover of the load signal B to a predefined fixed value $B_v$ of load.

Error detectors 23, 25 as well as switches 22, 24 can be implemented in the electronic control unit in the form of program algorithms to be executed by computing device 15.

Referring to FIG. 3, controlling the accumulator pressure preferably operates as described below. From an actual value $p_{B,actual}$ of bellows pressure determined by means of the pressure sensor as well as from the actual value $Z_{actual}$ of the relative level, an actual value $B_{actual}$ of load is determined via parameter map 21. In the malfunction-free case, this actual value $B_{actual}$ of the load is supplied as the load signal B to block 26. Concurrently, the actual value $Z_{actual}$ of relative level or, in the error case, the index value $Z_{index}$ of relative level is supplied as the deflection signal Z to block 26. By applying the correlation rules of block 26, computing device 15 calculates an index pressure value $P_{S,index}$ for the accumulator pressure. From this index pressure value $P_{S,index}$, there is subtracted, in a difference calculator 27, an actual value $P_{S,actual}$ of the accumulator pressure determined via the pressure sensor. The result is supplied as the difference to be corrected to three-point controller 28, which generates the switching signals $S_K$, $S_E$ in the manner discussed above.

Accordingly, the present invention provides a new method for controlling the pressure in a compressed-air accumulator of a level-control system for a motor vehicle wherein the relative level and/or load of the vehicle are used as physical pressure control variables. The present invention permits efficient operation of the level-control system characterized by, for example, low energy consumption, short times for raising and lowering the vehicle body, and the capability of using a compressor designed for the smallest possible delivery capacity.

It will thus be seen that the objects set forth above, among those made apparent from the preceding description, are efficiently attained, and since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for controlling pressure in a compressed-air accumulator of a level-control system of a motor vehicle, the level-control system having a pressure-control apparatus including a computing device and a compressed-air delivery device, the method comprising the steps of automatically determining an index pressure value using the computing device based on at least one of a relative level and a load of the vehicle, and adjusting accumulator pressure by actuating the compressed-air delivery device based on said index pressure value.

2. The method according to claim 1, wherein said index pressure value determined utilizing the computing device is higher the lower the relative level of the vehicle.

3. The method according to claim 1, wherein the computing device determines the load of the vehicle by means of at least one parameter map.

4. The method according to claim 1, wherein the computing device determines the load of the vehicle approximately by means of at least one of interpolation and extrapolation of values in at least one parameter map when at least one of the relative level and the load of the vehicle do not correspond to at least one of discrete relative levels and discrete loads in said at least one parameter map.

5. The method according to claim 1, wherein the pressure-control apparatus is a three-point controller.

6. The method according to claim 1, wherein the step of automatically determining an index pressure value using the computing device is based at least in part on a measured actual value of the relative level of the vehicle.

7. The method according to claim 1, wherein the step of automatically determining an index pressure value using the computing device is based at least in part on a predetermined index value of the relative level.

8. A method for controlling pressure in a compressed-air accumulator of a level-control system of a motor vehicle, the level-control system having a pressure-control apparatus including a computing device, the method comprising the steps of automatically determining an index pressure value using the computing device based on both a relative level and a load of the vehicle, and adjusting accumulator pressure based on said index pressure value utilizing the pressure-control apparatus.

9. The method according to claim 8, wherein said index pressure value determined utilizing the computing device is higher the lower the relative level of the vehicle.

10. The method according to claim 8, wherein the computing device determines the load of the vehicle by means of at least one parameter map.

11. The method according to claim 8, wherein the computing device determines the load of the vehicle approximately by means of at least one of interpolation and extrapolation of values in at least one parameter map when at least one of the relative level and the load of the vehicle do not correspond to at least one of discrete relative levels and discrete loads in said at least one parameter map.

12. The method according to claim 8, wherein the pressure-control apparatus is a three-point controller.

13. The method according to claim 8, wherein the step of automatically determining an index pressure value using the computing device is based at least in part on a measured actual value of the relative level of the vehicle.

14. The method according to claim 8, wherein the step of automatically determining an index pressure value using the computing device is based at least in part on a predetermined index value of the relative level.

* * * * *